United States Patent [19]

Stead et al.

[11] Patent Number: 5,496,891
[45] Date of Patent: Mar. 5, 1996

[54] MIXTURES AND CONCENTRATES FOR THE PREPARATION OF POLYMERS

[75] Inventors: Stanley G. Stead, Hemel Hempstead; Peter E. Minister, Leeds, both of Great Britain

[73] Assignee: Surfachem Group PLC, Leeds, United Kingdom

[21] Appl. No.: 170,268

[22] PCT Filed: May 11, 1992

[86] PCT No.: PCT/GB92/00842

§ 371 Date: Dec. 29, 1993

§ 102(e) Date: Dec. 29, 1993

[87] PCT Pub. No.: WO93/00369

PCT Pub. Date: Jan. 7, 1993

[30] Foreign Application Priority Data

Jun. 29, 1991 [GB] United Kingdom ............ 9114095

[51] Int. Cl.$^6$ .................. C08F 8/42; C08F 6/00; C08J 3/02
[52] U.S. Cl. .......... 525/330.2; 525/247; 524/556; 524/560; 528/480; 528/485; 528/488
[58] Field of Search ................. 524/556, 558, 524/560, 561; 528/480, 485, 488; 525/196, 247, 330.2; 521/38

[56] References Cited

U.S. PATENT DOCUMENTS

| | | | |
|---|---|---|---|
| 2,798,053 | 7/1957 | Brown | 521/58 |
| 3,915,921 | 10/1975 | Schlatzer, Jr. | 526/238.23 |
| 3,940,351 | 2/1976 | Schlatzer, Jr. | 260/17.4 |
| 4,062,817 | 1/1978 | Spaulding | 260/17.4 |
| 4,066,583 | 1/1978 | Spaulding | 526/317 |
| 4,690,971 | 9/1987 | Flesher et al. | 524/556 |
| 5,171,781 | 12/1992 | Farrar et al. | 524/556 |

FOREIGN PATENT DOCUMENTS

| | | |
|---|---|---|
| 0055055 | 6/1982 | European Pat. Off. |
| 0128237 | 12/1984 | European Pat. Off. |
| 0328725 | 8/1989 | European Pat. Off. |
| 0386897 | 9/1990 | European Pat. Off. |

OTHER PUBLICATIONS

Brochure SIGMA Prodotti Chimici, "SYNTHALEN Thickening Agents for Cosmetic/Pharmaceutical Formulations".
Brochure B. F. Goodrich: "Carbopol–Water Soluble Resins".

*Primary Examiner*—Tae H. Yoon
*Attorney, Agent, or Firm*—Rohm & Monsanto

[57] ABSTRACT

The invention of this patent application relates to carboxylic acid polymer compositions and in particular relates to concentrates of polymers which are subsequently used to prepare gels formed of diluted and neutralised polymer. Said polymers are currently supplied in a powder form. The polymers prepared by the addition of multivalent cations provide a concentrate which is the invention of this application and can be provided in either an aqueous form or granular or pelletised form which serves to eliminate existing problems in the powder form relating to the dispersion of the powder in water, the development of electrostatic charges in the said powder and the dusting of the powder. The concentrate of the invention provides a polymer for subsequent dilution and neutralisation for use as a gel wherein the conversion from one state to another is greatly improved.

45 Claims, No Drawings

MIXTURES AND CONCENTRATES FOR THE PREPARATION OF POLYMERS

The present invention relates to carboxylic acid polymer compositions. More particularly it relates to concentrates of acrylic acid polymers and their use to prepare gels of diluted and neutralized polymer.

The polymers to which the invention relates include, in an aqueous state, cross-linked polymers of acrylic acid, which constitute a well known and established class of polymers. Polyacrylic acid cross-linked with (poly) vinyl sucrose or (poly) vinyl pentaerythritol (also known as "allyl sucrose" and "allyl pentaerythritol) has been sold since 1954 and is commonly referred to as "carbomer", which is the official CTFA designation for such polymer. Carbomers are commercially available under the trade marks Carbopol (B F Goodrich Company), Acrisint (Sigma Prodotti Chimici S.r.l., Bergamo, Italy) and Synthalen (Sigma Prodotti Chimici S.r.l.), for example.

Carbomers are supplied in the acid form and when neutralized by the end user form aqueous gels at low concentrations of around 0.5% w/v, for example. The acid form of the polymer is also very viscous, but not as viscous as the neutralized form. Carbomers are commonly used in industry because of their desirable rheological, thickening and stabilising properties accompanied by low toxicity. Carbomers are therefore widely accepted for use in liquid detergents, cosmetics, toiletries and pharmaceuticals.

The properties of carbomers are well documented. When neutralized, they form useful aqueous gels at low concentrations which are normally of around 0.5% w/v. At slightly higher concentrations of around 2.5% the viscosity of the pastes obtained with the acid polymer is so high that the pastes become unworkable. Different types of carbomer (e.g. of different molecular weight) are available and these differ in their variation of viscosity with concentration.

Carbomers are incompatible with electrolytes (i.e. ions) because multivalent metal ions, in particular, cause a serious reduction in viscosity of the neutralized polymer. For these reasons, users of carbomers take care to avoid unnecessary contamination with electrolytes, for example by dispersing them in deionised water. Likewise, plastics containers or resin-lined metal packages are preferred for products containing a carbomer, in order to reduce the risk of contamination with metal ions. In accepted convention therefore it is unthinkable that anybody would deliberately add multivalent cations to a dispersion of carbomer.

Although carbomers have become indispensable, they have a disadvantage which is so serious that users of carbomers are apt to state that they would not use carbomers if they did not have to. The problem is that carbomers are manufactured as finely divided powders of low density which are extraordinarily difficult to handle. The powder becomes electrostatic and when being transferred out of containers or mixed with water tends to be attracted to and to adhere to available surfaces and to dust into the air necessitating dust extraction equipment thus preventing build-up on the floor where it can become slippery and dangerous if wetted; this problem is compounded by the reluctance of the powder to be wetted and to disperse in water. All this means that preparation of aqueous dispersions is dusty, messy and time-consuming unless special and expensive equipment is used.

One solution to the handling problems would be for the manufacturer or supplier to mix the powder with water and to supply the customer with an aqueous dispersion of the polymer. However, because of the relatively high viscosities reached even at low concentrations of the order of 2 to 3% w/v in water, it is not practicable or economic to supply carbomers as aqueous concentrates: dispersions containing more than 2 or 3% polymer are normally unworkably viscous but more dilute dispersions contain so much water that they are not economic to transport.

Numerous attempts have been made to provide commercially acceptable concentrates but these attempts have all involved disadvantages, in that they require inclusion of raw materials, e.g. oils, which restrict the possible range of use.

It therefore remains a goal to find a way of supplying carbomers such that their handling and mixing properties are more acceptable without introducing disadvantages that outweigh the improvement brought about.

In accordance with the present invention, it has been found that the inclusion of a proportion of salts of multivalent cations allows the ease of handling of the acidic, unneutralized cross-linked polyacrylic acid to be significantly increased without having a significant deleterious affect upon the viscosity of the product after neutralization and dilution.

The invention therefore provides a concentrate in an aqueous form or a mixture for the preparation of the aqueous gel in a granulate form of cross-linked polyacrylic acid said mixture and/or concentrate including multivalent cations (i.e. cations with a valency of two or more) therein.

In one aspect of the invention there is provided a concentrate of cross-linked polyacrylic acid in an aqueous form whose viscosity has been reduced by the inclusion in the concentrate of multivalent cations.

In a further aspect of the invention there is provided a mixture of cross-linked polyacrylic acid in a granulated form which includes therein multivalent cations. Said multivalent cations in granulated form serve to reduce the level of electrostatic in the granules and to increase the rate of dispersion when added to water.

The invention is not restricted, however, to carbomers or other cross-linked polyacrylic acids. More generally the invention is concerned with cross-linked polymers of olefinically-unsaturated carboxylic acids containing at least one activated carbon-to-carbon olefinic double bond, and at least one carboxyl group, that is, an acid containing an olefinic double bond which readily functions in polymerization because of its presence in the monomer molecule, either in the alpha-beta position with respect to a carboxyl group:

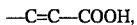

or as a part of a terminal methylene grouping:

The presence of a terminal methylene grouping in a carboxylic monomer makes this type of compound much more easily polymerizable than if the double bond were intermediate in the carbon structure. Olefinically-unsaturated acids of this class include such materials as the acrylic acids exemplified by acrylic acid itself, methacrylic acid, ethacrylic acid, alpha-chloroacrylic acid, alpha-cyanoacrylic acid, beta-methylacrylic acid (crotonic acid), alpha-phenyl acrylic acid, beta-acryloxy propionic acid, sorbic acid, alpha-chlorosorbic acid, angelic acid, cinnamic acid, p-chlorocinnamic acid, beta-styryl acrylic acid (1-carboxy-4-phenyl buta-1,3-diene) itaconic acid, citraconic acid, mesaconic acid, glutaconic acid, aconitic acid, maleic acid, fumaric acid, and tricarboxyethylene.

The preferred carboxylic monomers for use in this invention are the monoolefinic acrylic acids having the general structure

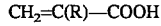

wherein R is hydrogen, halogen, nitrile (—C N), alkyl, aryl, aralkyl, alkaryl, alkarylalkyl, a cycloaliphatic group, alkylcycloaliphatic group or an alkylcycloaliphaticalkyl group. For example, R may be 1C–10C (e.g. 1C–4C) alkyl, phenyl, phenyl substituted by one or two 1C–4C alkyl groups (e.g. tolyl), phenyl 1C–4C alkyl (e.g. benzyl), phenyl 1C– 4C alkyl substituted by one or two 1C–4C alkyl groups (e.g. xylyl), or cyclohexyl. Exemplary alkyl groups for R are methyl, ethyl, propyl, octyl an decyl. Of this class, acrylic and methacrylic acid are most preferred because of generally lower cost, ready availability and ability to form superior polymers. Another useful carboxylic monomer is maleic acid.

The polymers contemplated include both homopolymeric carboxylic acids or the defined carboxylic acids copolymerized with one or more other vinylidene monomers containing at least one terminal $CH_2=CH<$ group. The comonomer is normally present in an amount of up to 30 weight percent of the copolymer. Such vinylidene monomers include, for example, acrylic ester monomers including those acrylic ester monomers having long chain aliphatic groups such as compounds represented by the formula:

wherein R' is an alkyl group with from 10 to 30 carbon atoms, preferably 10 to 20 carbon atoms, and R" is hydrogen, methyl or ethyl, present in the copolymer in an amount, for example, of from about 1 to 30 weight percent, and more preferably, no more than 15 weight percent. Representative higher alkyl acrylic esters are decyl acrylate, isodecyl acrylate, lauryl acrylate, stearyl acrylate, behenyl acrylate and melissyl acrylate and the corresponding methacrylates. Mixtures of two or three or more long chain acrylic esters may be successfully polymerized with a carboxylic monomer to provide useful resins. A useful class of copolymers are those methacrylates where the alkyl group contains 12 to 21 carbon atoms present in amounts of up to 15 weight percent of the total monomers. For example, polymers have been made with 10± 3 weight percent lauryl methacrylate, 7±3 weight percent stearyl methacrylate, with acrylic acid.

Other acrylic esters contemplated are also derivatives of an acrylic acid used in amounts, for example, of about 5 to 30 weight percent represented by the formula

wherein Y is alkyl, alkoxy, haloalkyl or cyanoalkyl, for example, having from 1 to 9 carbon atoms, especially 1 to 4 carbon atoms, and R" is hydrogen or a methyl or ethyl group.

These acrylic esters are normally present in the copolymer in an amount of up to 30 weight percent and more preferably up to 25 weight percent. Representative acrylates include methyl acrylate, ethyl acrylate, propyl acrylate, isopropyl acrylate, butyl acrylate, isobutyl acrylate, methyl methacrylate, methyl ethacrylate, ethyl methacrylate, octyl acrylate, heptyl acrylate, octyl methacrylate, iscpropyl methacrylate, 2-ethylhexyl acrylate, nonyl acrylate, hexyl acrylate, and n-hexylmethacrylate, for example. Mixtures of these two classes of acrylates provide useful copolymers.

Polymers according to the invention and their preparation are described in U.S. Pat. Nos. 2,798,053; 3,915,921; 3,940, 351; 4,062,817; and 4,066,583.

One preferred class of copolymer contemplated by the invention is cross-linked copolymers of acrylic acid or another olefinically unsaturated carboxylic acid as described above and minor amounts of hydrophobic comonomers.

There are commercially available copolymers of this type sold under the trade mark Pemulen. Pemulen are polymers of from 96 to 99 weight percent acrylic acid and from 1 to 4 percent of monomers containing hydrophobic (long chain alkyl or other hydrocarbon) side chains, in particular lauryl (12C) or stearyl (18C) methacrylate. Also preferred are other copolymers of an olefinically unsaturated carboxylic acid (e.g. acrylic acid) containing as a comonomer ethacrylate, methacrylate or acrylate (especially (meth)acrylate) esterified with hydrophobic groups, for example long chain (e.g. 10C to 30C, more preferably 10C to 20C) hydrocarbon groups and especially alkyl groups, the comonomer constituting up to 5% by weight of the polymer and more preferably up to 4% weight of the polymer. The provision of hydrophobic side chains is intended to make such polymers less sensitive to ions than are carbomers.

The polymer may also be a polycarbophil, i.e. a polymer of acrylic acid cross-linked with divinyl glycol.

The polymers may contain minor amounts of other olefinically unsaturated monomers, e.g. nitriles (for example, acrylonitrile) or amides (for example, methacrylamide). The proportion of such other monomer units is preferably no more than 30 weight percent, more preferably no more than 10% and most preferably no more than 5%, e.g. 1 to 2%, of the polymer.

Copolymers containing more than one class of comonomer in addition to the unsaturated carboxylic acid normally containing no more than 30 weight percent of comonomer in total.

The polymers are cross-linked with a multifunctional vinylidene monomer containing at lest 2 terminal $CH_2=C$ groups, for example, butadiene, isoprene, divinyl benzene, divinyl naphthalene and allyl acrylates. A particularly useful cross-linking monomer for use in preparing the copolymers is a polyalkenyl polyether having more than one alkenyl ether grouping per molecule. The most useful possess alkenyl groups in which an olefinic double bond is present attached to a terminal methylene grouping, $CH_2=C<$. They are made by the etherification of a polyhydric alcohol containing at least 4 carbon atoms and at least 3 hydroxyl groups. Compounds of this class way be produced by reacting an alkenyl halide, such as allyl chloride or allyl bromide, with a strongly alkaline aqueous solution of one or more polyhydric alcohols. The product is a complex mixture of polyethers with varying numbers of ether groups. Analysis reveals the average number of ether groupings on each molecule. Efficiency of the polyether cross-linking agent increases with the number of potentially polymerizable groups on the molecule. It is preferred to utilize polyethers containing an average of two or more alkenyl ether groupings per molecule.

Other cross-linking monomers include for example, diallyl esters, dimethallyl ethers, allyl or methallyl acrylates and acrylamides, tetraallyl tin, tetravinyl silane, polyalkenyl methanes, diacrylates and dimethacrylates, divinyl compounds such as divinyl benzene, polyallyl phosphate, diallyloxy compounds and phosphite esters, for example. Typical agents are allyl pentaerythritol, allyl sucrose, trimethylolpropane triacrylate, 1, 6-hexanediol diacrylate, pentaerythritol triacrylate, tetramethylene dimethacrylate, tetramethylene diacrylate, ethylene diacrylate, ethylene dimethacrylate and triethylene glycol dimethacrylate, for example. Allyl pentaerythritol and allyl sucrose [also known as (poly)vinyl pentaerythritol and (poly)vinyl sucrose] provide excellent polymers, for example in amounts of less than 5 weight percent, e.g., 3 weight percent.

The polymeric mixtures usually contain up to about 5% by weight of cross-linking monomer based on the total of carboxylic acid monomer, plus other monomers, if present, and more preferably, 0.1 to 2 weight percent.

The cross-linked polymers used in the invention all share the essential properties that the viscosity of an aqueous dispersion of the polymer in the acid form is reduced in the presence of multivalent cations and that they can form a much higher viscosity upon dilution and neutralization of the concentrate, and preferably form an aqueous gel.

Furthermore the cross-linked polymers used in the invention all share the essential properties that when presented in a granular form in addition with multivalent cations, the electrostatic in the granules is reduced over the known products and shows an increased .tendency to dispersion in water to form an aqueous gel upon dilution and neutralisation of the concentrate.

In principle, any salt of a metallic cation with a valency greater than one can be used in this invention provided the cation can react with the acid groups of the polymer. Even salts of other polymers are capable of being successfully used in this invention as is demonstrated in one of the Examples below. Because of the wide range of uses of the polymers, toxicological, environmental and economic reasons dictate that the most suitable and desirable materials to use are salts of calcium, magnesium, zinc and aluminium. At the same time many salts of multivalent cations are strongly coloured, which is generally undesirable. Iron, another cation which could in principle be used for the purpose of the invention, is a potent catalyst in promoting the degradation of these polymers in the presence of ultra-violet radiation. For practical purposes, therefore, the concentrate should be essentially free of iron, although the metal could be present so long as the concentrate was carefully protected from ultra-violet radiation.

The concentrate of the polymer and the cation are not critical, but in aqueous solution, should be selected to obtain the desired viscosity. The viscosity should be workable (e.g. scoopable out of a drum) and preferably such that the concentrate is pumpable, for ease of handling. Sometimes, a pourable concentrate may be desirable. Pumpability or pourability are difficult to define in terms of simple viscosity. In particular, the viscosity of polymer solutions varies widely with the rate of shear, which itself depends on, for example, whether the material is in the pump or the associated piping and upon the type of pump mechanism. However, some indications of suitable Brookfield viscosities (20 r.p.m., 25° C.) can be given. For example, the concentrate normally has a viscosity of no more than approximately 1500 Pa.s. A concentrate with a viscosity of 1500 Pa.s is not pumpable or particularly easy to handle and more usually the viscosity does not exceed about 100 Pa.s. Preferably the viscosity is less than 50 Pa.s and, for example, viscosities on the order of 40 to 42 Pa.s are acceptable. For greater convenience the viscosity is no more than 40 Pa.s. There is normally little advantage in having a viscosity of less than 5 Pa.s and viscosities of between 5 or 10 and 40 Pa.s appear to be most acceptable.

As indicated previously, the foregoing viscosity values of the concentrate when in aqueous form are not critical to the invention. The viscosity will normally be selected in practice to be suitable for the pump(s) available and such selection would be well within the ability of the skilled man. What is important is that viscosity of the concentrate should be reduced without unacceptably altering the properties of the diluted and neutralized solution.

Different polymers have different viscosities and have different sensitivities to cations. Likewise, different cations have different effects upon the viscosity of a given polymer.

It is therefore impossible to set down universal numerical limits regarding the polymer and cation concentrations. Since the dispersion of the invention is a concentrate, the polymer should be in a greater concentration than in the final neutralized gel; to obtain the full benefits of the invention, the polymer concentration should be greater than that practicable with a simple aqueous dispersion.

In granulated form the relationship between the relative quantities of cations to polymer is dependent on the particular polymers and cations to be used. Furthermore the relative concentration of the granules is dependent on the subsequent use of the neutralized gel to be formed and in particular the required viscosity of the same. It has been found that if compositions so described are granulated or pelletised the resulting products are found to have the advantage in that they are non-dusting and do not develop static charges, thereby greatly improving the handling characteristics of the carbomer. With regard to the dispersion of the granules in comparison with known products the granulated or pelletised product of the invention is found to flow very readily and to disperse when added to water or any aqueous material without any clumping of the granules occuring. Furthermore the granules hydrate at a speed comparative with the aqueous concentrate of the invention. In a further aspect the final dispersed state in water has such low viscosity that entrained air quickly rises to the surface to give an air free mixture.

The cation should be provided in an amount sufficient to reduce the viscosity of the polymer when in an aqueous state and to reduce the electrostatic and increase the rate of dispersion when in granular state but not so high as to reduce unacceptably the viscosity of the diluted and neutralized polymer. Normally, therefore, the cation will not have a significantly deleterious effect upon the diluted and neutralized polymer, e.g. does not reduce its viscosity by more than 30%, more preferably by no more than 20% and most preferably by no more than 10% or 15%.

Experiments indicate that the cation is preferably used in an amount of from 0.002 to 0.2 equivalent per equivalent of the acid groups of the polymer. An equivalents ratio of less than 0.002 does not normally give rise to a useful reduction in viscosity, and an equivalents ratio of greater than about 0.2 normally results in an unacceptable reduction in the viscosity of the diluted and neutralized polymer. More preferably the equivalents ratio is from 0.005 to 0.15 and most preferably from 0.01 to 0.05, e.g. 0.012 to 0.03.

The concentration of polymer in the aqueous state of the invention is generally greater than that normally practicable with a simple aqueous dispersion of the polymer and is usually at least 3% w/v and preferably at least 4% w/v. A polymer concentration of about 10% w/v is at the limits of workability in terms of viscosity and more preferably the polymer concentration does not exceed 8% w/v. Most preferably, the polymer is in an amount of 4 to 6% w/v, e.g. 5% w/v.

The concentrate may contain any suitable additives, e.g. biocides.

To form the aqueous state of the invention the concentrates may be prepared by mixing together an aqueous medium, preferably water, the polymer(s) and the cation salt (s) with any desired order of addition. It has been found, however, that mixing of the polymer with water can be significantly improved by dry blending the polymer(s) and the cation salt(s) prior to mixing with water; this is an important development in relation to preparation of the concentrates. Alternatively, mixing of the polymer(s) with water can be facilitated by mixing the water and cation salt(s) prior to mixing the polymer and water. From a practical viewpoint, it would be a considerable advantage to prepare a dry premix of polymer(s) and cation salt(s). Such premixes are included in the invention.

Although, in suitable cases, the concentrate could notionally be prepared by mixing the polymer and hard tap water containing sufficient calcium and/or magnesium hardness salts, the practical requirement for consistency of product indicates that the concentrate should be compounded commercially using deionised water with the controlled inclusion of cation(s) in the concentrate.

Similarly, it is recommendable to dilute the concentrate with deionised water, to avoid addition of cations which might unacceptably reduce the viscosity of the diluted and neutralized polymer.

To form the granulated mixture a dry blend of the desired polymer and multivalent cations in the quantities desired to produce the desired viscosity in the aqueous, neutralized gel, is undertaken and granulation of said dry blend is undertaken.

The invention will now be more particularly described by means of Examples. In the Examples, all percentage concentrations are percent solids weight by the volume of water. Viscosity values in the Examples are obtained using a Brookfield viscometer Model RVT, 20 r.p.m. spindle speed, at 25° C. and using an appropriate spindle for the viscosity.

EXAMPLE 1

(a) 10 g of Carbopol 980, a grade of carbomer manufactured by the B F Goodrich Chemical Company of Cleveland, Ohio, was stirred into 200 ml de-ionised water with a laboratory stirrer using the technique described in the product literature. Some difficulty was experienced in the mixing towards the end of the experiment. After about five minutes a thick, uneven paste was produced which contained unwetted agglomerates of dry powder. After standing for thirty minutes the mixture was stirred again to give as smooth a paste as possible. The viscosity, measured with a Brookfield rotating plate viscometer, was found to be 23000 Pa.s.

(b) 0.1 g of magnesium sulphate heptahydrate dissolved in 3 ml of water was added to half of the paste from Example 1(a) and stirred in with some difficulty. A rapid reduction in viscosity occurred, mixing became easier and a somewhat grainy paste was produced, as opposed to the lumpy paste produced in (a) above. The viscosity was measured and found to be 22.5 Pa.s and the paste was more easily handled than that in Example 1(a).

(c) The experiment described in Example 1(a) was repeated but with the addition of 0.2 g of magnesium sulphate heptahydrate to the water before the Carbopol 980 was added. On this occasion the mixture remained much less viscous throughout the process, was smoother and no dry lumpy matter was present. No remixing was needed before the viscosity was measured. This time a figure of 17 Pa.s was obtained and the paste was just capable of being poured.

10 g portions of each of the pastes were added to separate 90 ml portions of de-ionised water and stirred until homogeneous. This occurred quite quickly but noticeably the shortest time was taken by sample (c) and the longest by sample (a) . Each sample was neutralized by adding 0.6 g triethanolamine and again stirred until mixture was complete. The viscosity of the samples was measured with the results:

| Sample | 1(a) | 1(b) | 1(c) |
|---|---|---|---|
| Viscosity (Pa.s) | 38 | 35.5 | 36 |
| Equiv. Mg/Equiv. COOH | 0.0 | 0.012 | 0.012 |

These viscosity values are, within the limits of experimental error of the method, indistinguishable.

EXAMPLE 2

The experiment in Example 1(c) was repeated but the magnesium sulphate was replaced by 0.25 g potassium aluminium sulphate crystals. The results were:

| Sample | 2 |
|---|---|
| Viscosity 5% concentrate (Pa.s) | 15.7 |
| Viscosity 0.5% neutralized (Pa.s) | 36 |
| Equiv. Al/Equiv. COOH | 0.012 |

EXAMPLE 3

The experiment of Example 1(c) was repeated using a range of additions of magnesium sulphate. The results obtained were:

| Sample | 3(a) | 3(b) | 3(c) |
|---|---|---|---|
| Viscosity 5% concentrate (Pa.s) | 12.5 | 19 | 22 |
| Viscosity 0.5% neutralized (Pa.s) | 33.5 | 35.6 | 37.5 |
| Equiv. Mg/Equiv. COOH | 0.03 | 0.012 | 0.006 |

Increasing the $Mg^{++}$ content of the concentrate to 0.1 equivalents/COOH did not lead to precipitation of the carbomer but did greatly reduce viscosities of both the concentrate and, as claimed in the literature, the diluted gel.

EXAMPLE 4

A dry mixture of 0.5 g finely ground magnesium sulphate crystals and 10 g Carbopol 980 was prepared by simple mixing (Equiv. Mg/Equiv. COOH=0.031). The mixture was added to 200 ml de-ionised water while stirring with a laboratory stirrer. The mixture dispersed more rapidly than the Carbopol alone in Example 1(c) and with even less tendency to form lumps to give a thin, smooth readily pourable paste. After one week's storage the viscosity of the paste was 8.8 Pa.s Dilution with 9 times its weight of water and neutralization to a pH value of 6.9 gave a smooth glossy gel with excellent clarity and a viscosity of 30 Pa.s.

EXAMPLE 5

25 g of Carbopol 981 was dispersed in 500 ml de-ionised water containing 1.0 g magnesium sulphate heptahydrate. The resulting dispersion was readily pourable. Comparison of the viscosities of a comparable paste made without the magnesium salt gave:

| Sample | 5(a) | 5(b) |
|---|---|---|
| Viscosity 5% concentrate (Pa.s) | 21.8 | 13.3 |
| Viscosity 0.5% neutralized (Pa.s) | 7.5 | 13.3 |
| Equiv. Mg/Equiv. COOH | 0.0 | 0.025 |
| Clarity | Good | Good |

It was noticeable that the concentrate 5(a) tended to climb up the shaft of the stirrer making mixing more difficult although this did not occur to the same extent in 5(b).

EXAMPLE 6

22.68 kilos of Carbopol 940 was placed in the hopper of a Silverson Flashblend machine. 430 liters of water containing 1075 g methyl hydroxybenzoate, a preservative, and 450 g magnesium sulphate crystals were mixed in the tank. The machine was started and sucked the Carbopol powder through the mixing head on the Flashblend, with a residence time in the head of about 1 second and Into the tank. The Carbopol was completely mixed in about 6 minutes to give a slightly grainy paste, free from lumps, which became smooth on stirring with a propeller stirrer. The paste was run under its own head into drums. The viscosity of a 0.5% neutralized gel prepared from the paste was 40.2 Pa.s and the Mg/COOH ratio was 0.012.

EXAMPLE 7

10 g of Carbopol 980 was dry blended with 1.1 g of zirconium propionate and stirred into 200 ml de-ionised water (sample 7(a)). The resulting paste was diluted with nine times its weight of water and neutralized with caustic soda. The experiment was repeated using 2.2 g of zirconium propionate to give sample 7(b). Measurement gave the following figures:

| Sample | 7(a) | 7(b) |
|---|---|---|
| Viscosity 5% concentrate (Pa.s) | 33.7 | 33.7 |
| Viscosity 0.5% neutralized (Pa.s) | 37.3 | 33.7 |
| Equiv. Zr/Equiv. COOH | 0.013 | 0.026 |

The neutralized gels produced in the Example were cloudy in appearance, probably because of the presence of precipitated zirconium hydroxide.

EXAMPLE 8

10 g of Carbopol 980 was dry blended with 0.25 g of the calcium salt of polycarbophil, a polymer of acrylic acid cross linked with di-vinyl glycol (Noveon CA-1, B F Goodrich Company). It was added to 200 ml de-ionised water with stirring. A paste was formed more viscous than that produced in Example 1(c). After standing for 12 hours measurement gave:

| Sample | 9 |
|---|---|
| Viscosity after standing 12 hours (Pa.s) | 41.2 |
| Viscosity 0.5% neutralized (Pa.s) | 39 |
| Equiv. total Ca/Equiv. COOH | 0.20 |

These last two results clearly show that, provided the multivalent cation is available to react with the acrylic acid polymer, a marked reduction in the viscosity of the unneutralized dispersion can be obtained without economically significant loss of viscosity or clarity after neutralization. In this way concentrates of these polymers can be prepared at practically feasible strengths.

EXAMPLE 9

A 10% dispersion of Carbopol 934 in water was prepared with some difficulty (sample 9 (a)). It was split into portions and to each portion was added 25% magnesium sulphate solution to give varying ratios of Carbepol to magnesium. After two hours the viscosities were measured in the usual way.

| Sample | 9(a) | 9(b) |
|---|---|---|
| Viscosity 10% concentrate (Pa.s) | 3200 | 1840 |
| Viscosity 0.5% neutralized (Pa.s) | 17.6 | 19.9 |
| Equiv. Mg/Equiv. COOH | 0.0 | 0.063 |

| Sample | 9(c) | 9(d) |
|---|---|---|
| Viscosity 10% concentrate (Pa.s) | 1500 | 1300 |
| Viscosity 0.5% neutralized (Pa.s) | 12.3 | 1.0 |
| Equiv. Mg/Equiv. COOH | 0.12 | 0.25 |

EXAMPLE 10

A 5% dispersion of Pemulen TR1 (B F Goodrich) was prepared and increasing proportions of a 25% solution of magnesium sulphate crystals (MgSO$_4$.7H$_2$O) added to different portions. After stirring, the viscosity of each portion was measured. Part of each concentrate was diluted to give a 1% solution after neutralization and the viscosity of each sample was measured.

| | Viscosity Pa.s 5% concentrate | 1% solution | Equiv. Mg/ Equiv. COOH |
|---|---|---|---|
| Pemulen TRI (A) | 31.1 | 37.5 | 0.0 |
| A + 0.05% MgSO$_4$ | 29.8 | 35.2 | 0.006 |
| A + 0.1% MgSO$_4$ | 11.0 | 33.7 | 0.012 |
| A + 0.25% MgSO$_4$ | 6.7 | 34.5 | 0.031 |
| A + 0.5% MgSO$_4$ | 5.0 | 30.0 | 0.062 |

We claim:

1. A concentrate for preparing a gel of a neutralized cross-linked polymer of a polymerisable olefinically unsaturated carboxylic acid, the unsaturated carboxylic acid constituting at least 70% by weight of the polymer and the polymer being cross-linked with a multifunctional vinylidene compound containing at least two terminal CH$_2$=C<groups, the concentrate comprising at least the cross-linked polymer, the polymer being in the acid form; and a salt of a multivalent cation, the salt being present in an amount of from 0.002 to 0.2 equivalent of the multivalent cation per equivalent of the acid groups of the polymer.

2. The concentrate of claim 1 wherein the polymer is selected from the group consisting of:

(i) a homopolymer of an unsaturated carboxylic acid of the formula (I):

CH$_2$=C(R)—COOH wherein R contains up to ten carbon atoms and is selected from the group consisting of hydrogen, halogen, nitrile, alkyl, aryl, aralkyl, alkaryl, alkarylalkyl, a cycloaliphatic group, an alkyl cycloaliphatic group, and an alkylcycloaliphaticalkyl group; and (ii) a copolymer comprising at least 85% by weight of the unsaturated carboxylic acid of formula (I) and no more than 15% by weight of a 10 to 30 carbon alkyl ester of acrylic acid, methacrylic acid or ethacrylic acid.

3. The concentrate of claim 1 wherein the multivalent cation is a metal ion.

4. The concentrate of claim 3 wherein the metal ion is selected from the group consisting of calcium, magnesium, zinc, aluminum ions, and mixtures thereof.

5. The concentrate of claim 1 wherein the multivalent cation is present in an amount to reduce the viscosity of the concentrate.

6. The concentrate of claim 1 wherein the polymer is present in an amount of from 3 to 10% w/v.

7. The concentrate of claim 1 further comprising an aqueous medium and wherein the salt of the multivalent cation is in a concentration sufficient to reduce the viscosity of the concentrate but insufficient to reduce the viscosity of a dispersion prepared by diluting and neutralizing the concentrate by more than 30%.

8. The concentrate of claim 7 wherein the aqueous medium is water.

9. The concentrate of claim 7 wherein the polymer is selected from the group consisting of:

(i) a homopolymer of an unsaturated carboxylic acid of the formula (I):

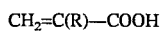

wherein R contains up to ten carbon atoms and is selected from the group consisting of hydrogen, halogen, nitrile, alkyl, aryl, aralkyl, alkaryl, alkarylalkyl, a cycloaliphatic group, an alkyl cycloaliphatic group, and an alkylcycloaliphaticalkyl group; and (ii) a copolymer comprising at least 85% by weight of the unsaturated carboxylic acid of formula (I) and no more than 15% by weight of a 10 to 30 carbon alkyl ester of acrylic acid, methacrylic acid or ethacrylic acid.

10. The concentrate of claim 9 wherein the cross-linked polymer is a cross-linked polyacrylic acid or a cross-linked copolymer comprising at least 90% by weight acrylic acid units and less than 10% by weight comonomer.

11. The concentrate of claim 10 wherein the cross-linked polymer is polyacrylic acid cross-linked with allyl pentaerythritol or allyl sucrose.

12. The concentrate of claim 10 wherein the cross-linked polymer is a copolymer comprising 96 to 99 weight percent acrylic acid units and 4 to 1 weight percent methacrylic acid units esterified with a 10 to 30 carbon alkyl group, the copolymer being cross-linked with allyl pentaerythritol or allyl sucrose.

13. The concentrate of claim 7 wherein the multivalent cation is a metal ion.

14. The concentrate of claim 13 wherein the metal ion is selected from the group consisting of calcium, magnesium, zinc, aluminum ions, and mixtures thereof.

15. The concentrate of claim 7 which comprises from 0.005 to 0.15 equivalent of multivalent cation per equivalent of the acid groups of the polymer.

16. The concentrate of claim 15 which comprises from 0.01 to 0.05 equivalent of multivalent cation per equivalent of the acid groups of the polymer.

17. The concentrate of claim 7 wherein the polymer is present in an mount of from 3 to 10 percent w/v.

18. The concentrate of claim 17 wherein the polymer is present in an amount of no more than 8% w/v.

19. (Twice Amended) The concentrate of claim 8 wherein the polymer is in an amount of 4 to 10 percent w/v.

20. An aqueous concentrate for preparing a gel of neutralized cross-linked polymer of acrylic acid, comprising:

water;

from 3% to 8% w/v of a polymer comprising cross-linked polyacrylic acid optionally comprising up to 5% by weight of (meth)acrylic acid esterified with a hydrophobic group, the polyacrylic acid being cross-linked with a multifunctional vinylidene compound which contains at least two terminal $CH_2=C<$ groups; and a salt of a multivalent metal cation in an mount of from 0.002 to 0.20 equivalent per equivalent of the acid groups of the polymer.

21. The aqueous concentrate of claim 20 wherein the polymer is cross-linked polyacrylic acid or a cross-linked polymer of 96% to 99% by weight percent acrylic acid units and 1% to 4% by weight percent methacrylic acid esterified with a 10 to 30 carbon alkyl.

22. The aqueous concentrate of claim 20 wherein the multivalent metal cation is present in an amount of from 0.005 to 0.05 equivalent per equivalent of the acid groups of the polymer.

23. The aqueous concentrate of claim 20 wherein the salt of a multivalent cation is a salt of a metal ion is selected from the group consisting of calcium, magnesium, zinc, aluminum ions, and mixtures thereof.

24. The aqueous concentrate of claim 20 wherein the polymer is in an amount of from 4% to 6% w/v.

25. A method of preparing a concentrate for a gel of a neutralized cross-linked polymer of a polymerisable olefinically unsaturated carboxylic acid, the method comprising the step of:

mixing together a premix of the polymer in the acid form and a salt of a multivalent cation with water, the salt being present in an amount of from 0.002 to 0.2 equivalent of the multivalent cation per equivalent of the acid groups of the polymer.

26. The method of claim 25 wherein the premix for preparing a concentrate is a dry mixture of the polymer in the acid form and the salt of a multivalent cation.

27. A method of preparing a concentrate for a gel of a neutralized cross-linked polymer of a polymerisable olefinically unsaturated carboxylic acid, the method comprising the step of:

mixing together a premix of water and a salt of a multivalent cation with the polymer in the acid form, the salt being present in an amount of from 0.002 to 0.2 equivalent of the multivalent cation per equivalent of the acid groups of the polymer.

28. A method of making an aqueous gel of a cross-linked carboxylic acid polymer comprising diluting and neutralizing a concentrate as prepared by the method of claim 26.

29. The method of claim 28 further comprising the step of formulating the aqueous gel into a liquid detergent, cosmetic, toiletry, pharmaceutical or other product, or intermediate therefor.

30. A premix for preparing a concentrate for a gel of a neutralized cross-linked polymer of a polymerisable olefinically unsaturated carboxylic acid, the premix comprising a dry mixture of the polymer in the acid form and a salt of a multivalent cation, the salt being present in an amount of from 0.002 to 0.2 equivalent of the multivalent cation per equivalent of the acid groups of the polymer.

31. A dry polymer preparation comprising:

a cross-linked polymer of a polymerisable olefinically unsaturated carboxylic acid, the unsaturated carboxylic acid constituting at least 70% by weight of the polymer and the polymer being cross-linked with a multifunctional vinylidene compound containing at least two terminal $CH_2=C<$ groups and being in the acid form; and a salt of a multivalent cation in an amount of from 0.002 to 0.2 equivalent of multivalent cation per equivalent of the acid groups of the polymer.

32. The dry polymer preparation of claim 31 wherein the polymer is selected from the group consisting of:

(i) a homopolymer of an unsaturated carboxylic acid of the formula (I):

$CH_2=C(R)—COOH$ wherein R contains up to ten carbon atoms and is selected from the group consisting of hydrogen, halogen, nitrile, alkyl, aryl, aralkyl, alkaryl, alkarylalkyl, a cycloaliphatic group, an alkyl cycloaliphatic group, and an alkylcycloaliphaticalkyl group; and (ii) a copolymer comprising at least 85% by weight of the unsaturated carboxylic acid of formula (I) and no more than 15% by weight of a 10 to 30 carbon alkyl ester of acrylic acid, methacrylic acid or ethacrylic acid.

33. The dry polymer preparation of claim 31 wherein the cross-linked polymer is polyacrylic acid cross-linked with allyl pentaerythritol or allyl sucrose.

34. The dry polymer preparation of claim 31 wherein the cross-linked polymer is a copolymer comprising 96 to 99 weight percent acrylic acid units and 4 to 1 weight percent methacrylic acid units esterified with a 10 to 30 carbon alkyl group, the copolymer being cross-linked with allyl pentaerythritol or allyl sucrose.

35. The dry polymer preparation of claim 31 wherein the multivalent cation is a metal ion.

36. The dry polymer preparation of claim 35 wherein the metal ion is selected from the group consisting of calcium, magnesium, zinc, aluminum ions, and mixtures thereof.

37. The dry polymer preparation of claim 31 which comprises from 0.002 to 0.02 equivalent of multivalent cation per equivalent of the acid groups of the polymer.

38. A dry polymer preparation comprising:

a polymer comprising cross-linked polyacrylic acid optionally comprising up to 5% by weight of (meth-)acrylic acid esterified with a hydrophobic group, the polyacrylic acid being cross-linked with a multifunctional vinylidene compound which contains at least two terminal $CH_2=C<$ groups and being in the acid form; and a salt of a multivalent metal cation present in an amount of from 0.002 to 0.20 equivalent per equivalent of the acid groups of the polymer.

39. The dry polymer preparation of claim 38 which is granular.

40. A method of making an aqueous gel of a cross-linked carboxylic acid polymer comprising wetting and neutralizing the granular dry polymer preparation of claim 39.

41. The method of claim 40 further comprising the step of formulating the aqueous gel into a liquid detergent, cosmetic, toiletry, pharmaceutical or other product, or intermediate therefor.

42. The method of claim 40 wherein the dry polymer preparation facilitates dispersing of the polymer in an aqueous medium.

43. The dry polymer preparation of claim 31 wherein the cross-linked polymer is a cross-linked polyacrylic acid or a cross-linked copolymer comprising at least 90% by weight acrylic acid units and less than 10% by weight comonomer.

44. The dry polymer preparation of claim 38 wherein the polymer is cross-linked polyacrylic acid or a cross-linked polymer of 96% to 99% by weight acrylic acid units and 1% to 4% by weight methacrylic acid esterified with a 10 to 30 carbon alkyl.

45. A method of making a dry polymer preparation comprising:

forming a dry blend of a cross-linked polymer of a polymerisable olefinically unsaturated carboxylic acid, the unsaturated carboxylic acid constituting at least 70% by weight of the polymer and the polymer being cross-linked with a multifunctional vinylidene compound containing at least two terminal $CH_2=C<$ groups and being in the acid form and a salt of a multivalent cation in an amount of from 0.002 to 0.2 equivalent of multivalent cation per equivalent of the acid groups of the polymer; and granulating said dry blend.

* * * * *